(12) United States Patent
Tsutsumi et al.

(10) Patent No.: US 8,268,231 B2
(45) Date of Patent: Sep. 18, 2012

(54) TREATMENT METHOD FOR HIGH-TEMPERATURE EXHAUST GAS

(75) Inventors: Hirofumi Tsutsumi, Kobe (JP); Yutaka Miyakawa, Kobe (JP); Tadashi Yaso, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 205 days.

(21) Appl. No.: 12/594,827

(22) PCT Filed: Apr. 3, 2008

(86) PCT No.: PCT/JP2008/056685
§ 371 (c)(1),
(2), (4) Date: Oct. 6, 2009

(87) PCT Pub. No.: WO2008/126759
PCT Pub. Date: Oct. 23, 2008

(65) Prior Publication Data
US 2010/0107939 A1      May 6, 2010

(30) Foreign Application Priority Data

Apr. 9, 2007   (JP) .................................. 2007-101888

(51) Int. Cl.
*F23J 15/02* (2006.01)
(52) U.S. Cl. .......................................... 266/44; 266/147
(58) Field of Classification Search .................... 266/44, 266/144, 145, 147
See application file for complete search history.

(56) References Cited

U.S. PATENT DOCUMENTS

| 4,022,869 A | * | 5/1977 | Saitoh et al. ............... 423/240 R |
| 4,642,127 A | | 2/1987 | Ando et al. |

(Continued)

FOREIGN PATENT DOCUMENTS

JP         57 43913         3/1982

(Continued)

OTHER PUBLICATIONS

Japanese Office Action issued on Mar. 29, 2011 in corresponding Japanese Application No. 2007-101888 (with an English Translation).

*Primary Examiner* — Scott Kastler
(74) *Attorney, Agent, or Firm* — Oblon, Spivak, McClelland, Maier & Neustadt, L.L.P.

(57) ABSTRACT

This invention is intended to lower a temperature of a high-temperature exhaust gas to a desired temperature, while effectively suppressing adhesion of melting components and dusts in the high-temperature exhaust gas onto an inner wall of a cooling tower. For this purpose, a method of the present invention comprises an introduction step of introducing a high-temperature exhaust gas into a cooling tower through a gas duct, and a cooling step of sparging cooling water to the high-temperature exhaust gas in the cooling tower to cool the high-temperature exhaust gas. During the introduction step, the high-temperature exhaust gas is introduced into the cooling tower through the gas duct comprising two gas duct lines, in such a manner that respective portions of the high-temperature exhaust gas from the two gas duct lines become equal to each other in flow velocity and flow volume. Further, respective axes of the two gas duct lines are arranged so as to extend in directions opposed to each other and approximately orthogonal to an axis of the cooling tower, when viewed from a direction along the axis of the cooling tower.

8 Claims, 8 Drawing Sheets

U.S. PATENT DOCUMENTS

2001/0042496 A1    11/2001  Tateishi et al.
2010/0116140 A1 *   5/2010  Arai et al. .................. 96/252

FOREIGN PATENT DOCUMENTS

| JP | 9 33179 | 2/1997 |
| JP | 9 178367 | 7/1997 |
| JP | 9 287729 | 11/1997 |
| JP | 11 270836 | 10/1999 |
| JP | 2000 179832 | 6/2000 |
| JP | 2001 181720 | 7/2001 |
| JP | 2002 136826 | 5/2002 |
| JP | 2004 61009 | 2/2004 |
| JP | 2004 309030 | 11/2004 |

* cited by examiner

PRIOR ART

ROTATION DIRECTION

FIG. 9A

Prior Art

FIG. 9B

Prior Art

FIG. 10

Prior Art

TREATMENT METHOD FOR HIGH-TEMPERATURE EXHAUST GAS

TECHNICAL FIELD

The present invention relates to a method for treating a high-temperature exhaust gas containing dusts, and more specifically to a method designed such that a high-temperature exhaust gas discharged from a reducing furnace, such as a rotary hearth furnace for producing reduced iron, is introduced into a cooling tower to be cooled.

BACKGROUND ART

Generally, a high-temperature exhaust gas discharged from a high-temperature gas generation source, such as an incinerator, a melting furnace or a reducing furnace, is subjected to a cooling treatment. This cooling treatment is intended to adjust a temperature of the high-temperature exhaust gas to a value suitable for use as a heat source for a boiler in a subsequent process, and/or lower a temperature of the high-temperature exhaust gas to a value equal to or less than an allowable temperature limit of a dust collector so as to allow the high-temperature exhaust gas to be released to ambient air after collecting dusts therein by the dust collector. The cooling treatment is performed by introducing a high-temperature exhaust gas discharged from the incinerator or the fusion furnace, into a cooling tower, and cooling the high-temperature exhaust gas by a wet process based on a scrubber or sprinkling of cooling water, within the cooling tower.

However, the process of cooling a high-temperature exhaust gas discharged from a incinerator, a fusion furnace, a reducing furnace or the like, by spraying cooling water within the cooling tower is highly likely to produce an adherent substance in the cooling tower. Specifically, since there are mixed ashes and solid dusts including a volatile (i.e., vaporizable) component, such as zinc or lead, and a melting component, such as alkali metal, oxide or chloride, in the high-temperature exhaust gas, the process of cooling this high-temperature exhaust will produce a liquefied substance of the volatile component and a solidified substance of the melting component, i.e., solid dusts, and cause a risk that the liquefied substance or the solid dusts adhere onto an inner wall of the cooling tower.

This phenomenon will be more specifically described by taking a rotary hearth furnace which is one type of a reducing furnace for use in producing reduced iron, as one example.

Figure 8:
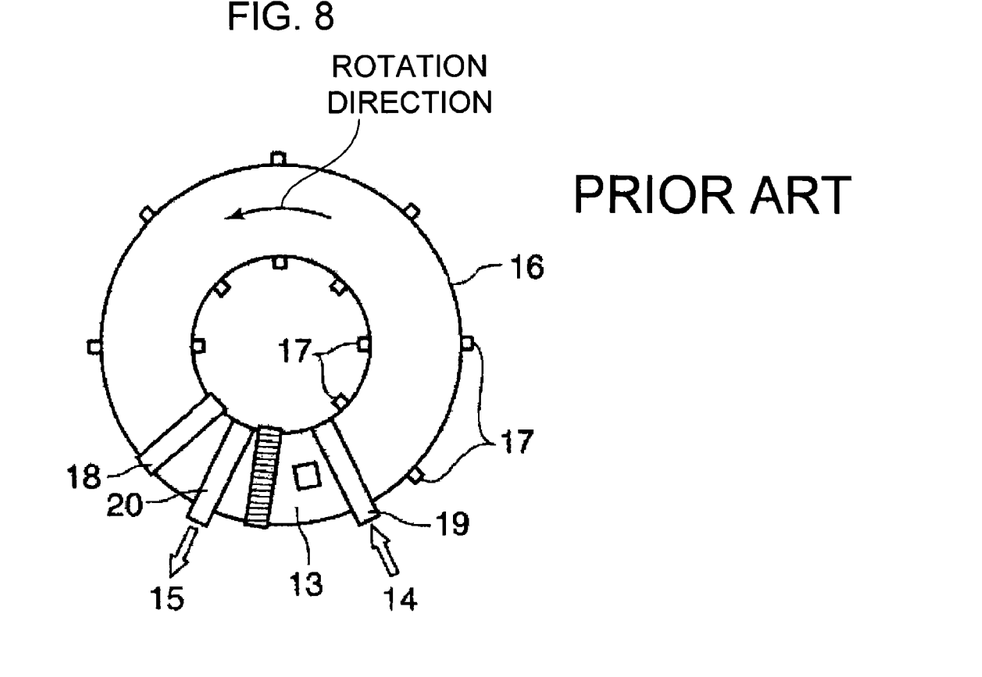
FIG. 8 is a top plan view showing an outline of an example of a conventional rotary hearth furnace facility.

Firstly, one example of a reduced-iron production process using the rotary hearth furnace will be described step by step, with reference to FIG. 8 which schematically shows the structure of a rotary hearth furnace facility.

(1) An iron oxide (e.g., iron mineral or electric furnace dust) in powder form and a carbonaceous reducing agent (e.g., coal or coke) are mixed together, and pelletized. In this way, raw pellets are produced.

(2) The raw pellets are heated in a temperature range without ignition of a flammable volatile substance generated from inside the pellets. This heating eliminates water adherent to the raw pellets to produce dried pellets 14 illustrated in FIG. 8.

(3) The dried pellets 14 are supplied into a rotary hearth furnace 16 by an appropriate charging device 19, to form a pellet layer having a thickness equivalent to a size of about one or two pellets, on a rotary hearth 13.

(4) There is performed a combustion in a burner 17 arranged on an upper side of an inside of the furnace to radiation-heat the pellet layer to reduce it, thus metallizing the pellet layer.

(5) The metalized pellets are cooled by a cooling device 18. This cooling may be performed by directly blowing gas against the pellets or by indirectly cooling the pellets using a cooling jacket, for example. This cooling gives a mechanical strength tolerant to handlings during and after discharging the pellets. The cooled pellets, i.e., reduced iron pellets 15, are discharged outside the furnace by a discharge device 20.

(6) Immediately after the discharge of the reduced iron pellets 15, next dried pellets are charged by the charging device 19.

Reduced iron is produced by repeatedly performing the above process (see, for example, the following Patent Publication 1).

In the rotary hearth furnace for use in producing reduced iron, a high-temperature exhaust gas generated in the furnace is drawn from an exhaust-gas discharge area provided on a circumference of the rotary hearth furnace into a gas duct connected to a ceiling portion of the exhaust-gas discharge area, and introduced into an exhaust-gas treatment facility provided downstream of the gas duct to be treated therein.

This high-temperature exhaust gas, which contains dusts such as ash, will be finally released to ambient air after treated by a dust collector. The temperature of the high-temperature exhaust gas, which is generally equal to or greater than an allowable temperature limit of the dust collector, requires the high-temperature exhaust gas to be cooled down to a temperature allowing for the treatment by the dust collector before introduced thereinto.

Figure 9A:
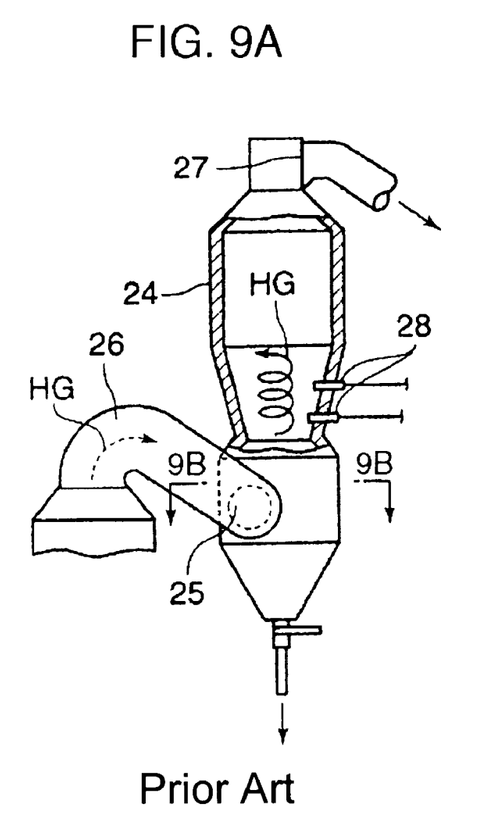
FIG. 9A is a partially sectional side view.
Figure 9B:
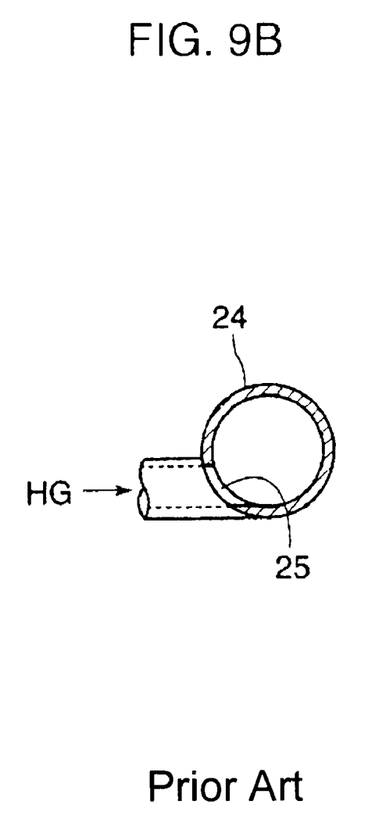
FIG. 9B is a sectional view taken along the line 9B-9B in FIG. 9A.
Figure 10:
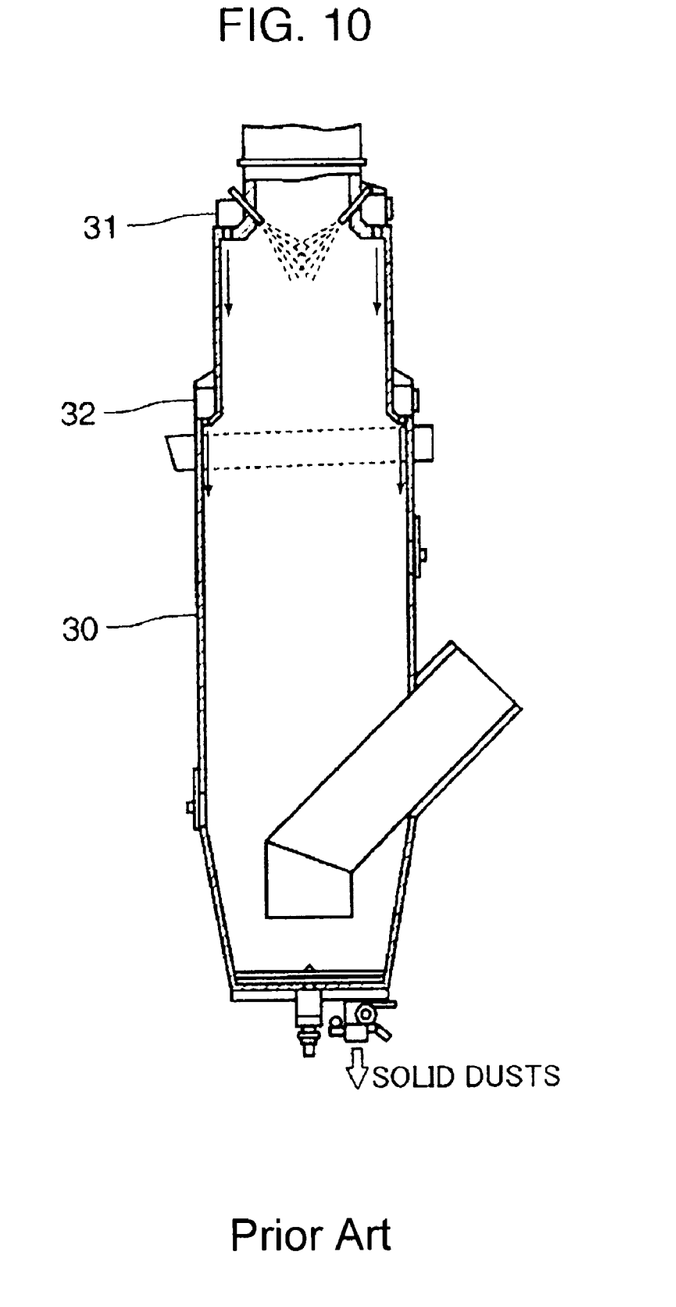
FIG. 10 is a sectional view of a temperature control tower for use in a conventional high-temperature exhaust-gas treatment method.

As follows will be described a (cooling) treatment method and apparatus for the high-temperature exhaust gas according to an example of a conventional technique with reference to FIGS. 9 and 10. FIG. 9 shows a gas-cooling chamber disclosed in the following Patent Publication 2, wherein FIG. 9A is a partially cut-off side view, and FIG. 9B is a view taken along the arrowed line 9B-9B. FIG. 10 is a sectional view of a temperature control tower for use in a high-temperature exhaust-gas treatment method disclosed in the following Patent Publication 3.

In FIG. 9, a high-temperature exhaust gas HG is introduced into a lower portion of a cylindrical-shaped gas-cooling chamber 24 through a gas duct 26 to move upwardly therein while swirling, and then discharged from an upper portion of the cooling chamber 24. Cooling water is sprayed to the swirling flow of the upwardly-moving exhaust gas HG, and water droplets of the sprayed cooling water move upwardly together with the exhaust gas HG to cool the exhaust gas HG. The gas duct 26 is connected to an inlet 25 provided in the lower portion of the gas-cooling chamber 24 from a tangential direction of an outer peripheral surface of the gas-cooling chamber 24, to establish fluid communication with an internal space of the gas-cooling chamber 24. The gas-cooling chamber 24 has a top portion, which is provided with a gas outlet 27. A plurality of cooling-water spray nozzles 28 are mounted to a vertically-intermediate portion of the gas-cooling chamber 24, to spray the cooling water to the swirling flow of the upwardly-moving exhaust gas HG.

In the high-temperature exhaust-gas treatment method disclosed in the Patent Publication 3, a high-temperature exhaust gas discharged from a high-temperature gas generation source is blown into a temperature control tower 30 illustrated in FIG. 10. This temperature control tower 30 has an expanding stepped portion 31, 32 having a diameter which increases stepwise toward a downstream side of a flow direction of the high-temperature exhaust gas. Cooling water is sprayed to a gas flow of the high-temperature exhaust gas blown into the temperature control tower 30, to adjust a temperature of the blown-in high-temperature exhaust gas. The temperature adjustment separates solid dusts from the high-temperature exhaust gas, and the solid dusts are discharged outside the temperature control tower 30 to be collected. The exhaust gas discharged from the temperature control tower after completion of the temperature adjustment contains volatile/melting component dusts, which are collected by a bag filter.

In the above high-temperature exhaust-gas treatment method, forming a spiral-pattern swirling flow of a high-temperature exhaust gas introduced into the gas-cooling chamber enables reduction in size of the gas-cooling chamber and enhancement in dust collection function of the temperature control tower. However, it is still impossible to solve the problem that a mixture of cooling water sprayed into a cooling facility and melting components and dusts in a high-temperature exhaust gas adheres onto an inner wall of the facility as a solidified substance to cause operational difficulties.

[Patent Publication 1] JP 2001-181720A
[Patent Publication 2] JP 09-178367A
[Patent Publication 3] JP 2002-136826A

DISCLOSURE OF THE INVENTION

It is an object of the present invention to provide a high-temperature exhaust-gas treatment method capable of lowering a temperature of a high-temperature exhaust gas to a desired temperature, while effectively suppressing adhesion of melting components and dusts in the high-temperature exhaust onto an inner wall of a cooling tower.

In order to achieve the above object, a high-temperature exhaust-gas treatment method of the present invention comprises an introduction step of introducing a high-temperature exhaust gas into a cooling tower through a gas duct, and a cooling step of spraying cooling water to the high-temperature exhaust gas in the cooling tower to cool the high-temperature exhaust gas. During the introduction step, the high-temperature exhaust gas is introduced into the cooling tower through the gas duct comprising two gas duct lines, in such a manner that respective portions of the high-temperature exhaust gas from the two gas duct lines become equal to each other in flow velocity and flow volume, and respective axes of the two gas duct lines are arranged so as to extend in directions opposed to each other and approximately orthogonal to an axis of the cooling tower, when viewed from a direction along the axis of the cooling tower.

BRIEF DESCRIPTION OF DRAWINGS

FIG. 5 is a velocity distribution map in the cooling tower of the high-temperature exhaust-gas treatment system according to the first embodiment of the present invention, wherein

FIG. 9 illustrates one example of a conventional gas-cooling chamber, wherein

BEST MODE FOR CARRYING OUT THE INVENTION

Figure 1:
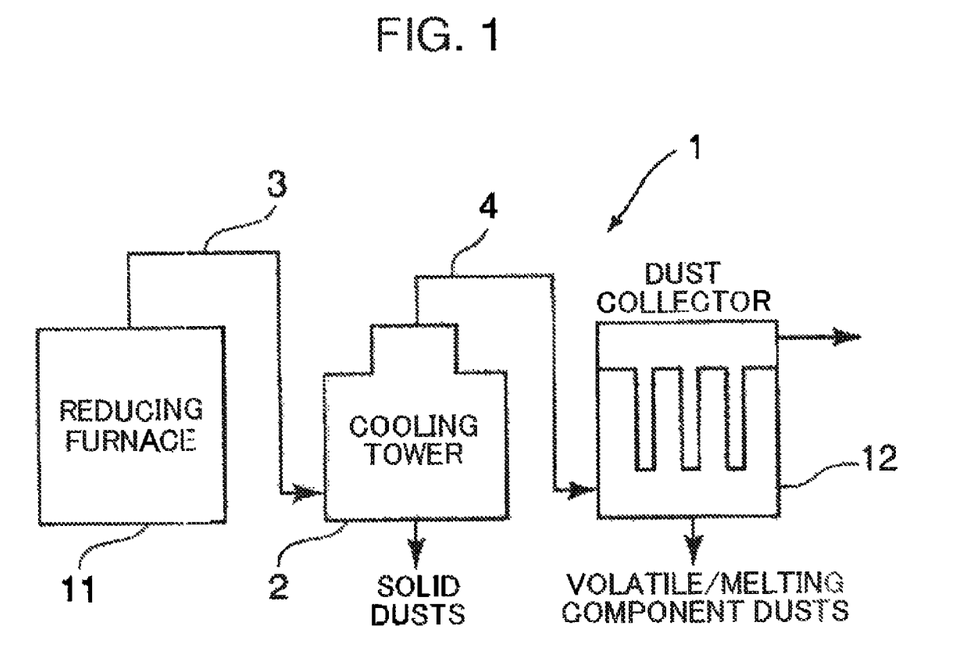
FIG. 1 is a schematic system diagram for explaining a high-temperature exhaust-gas treatment system according to a first embodiment of the present invention.
Figure 2:
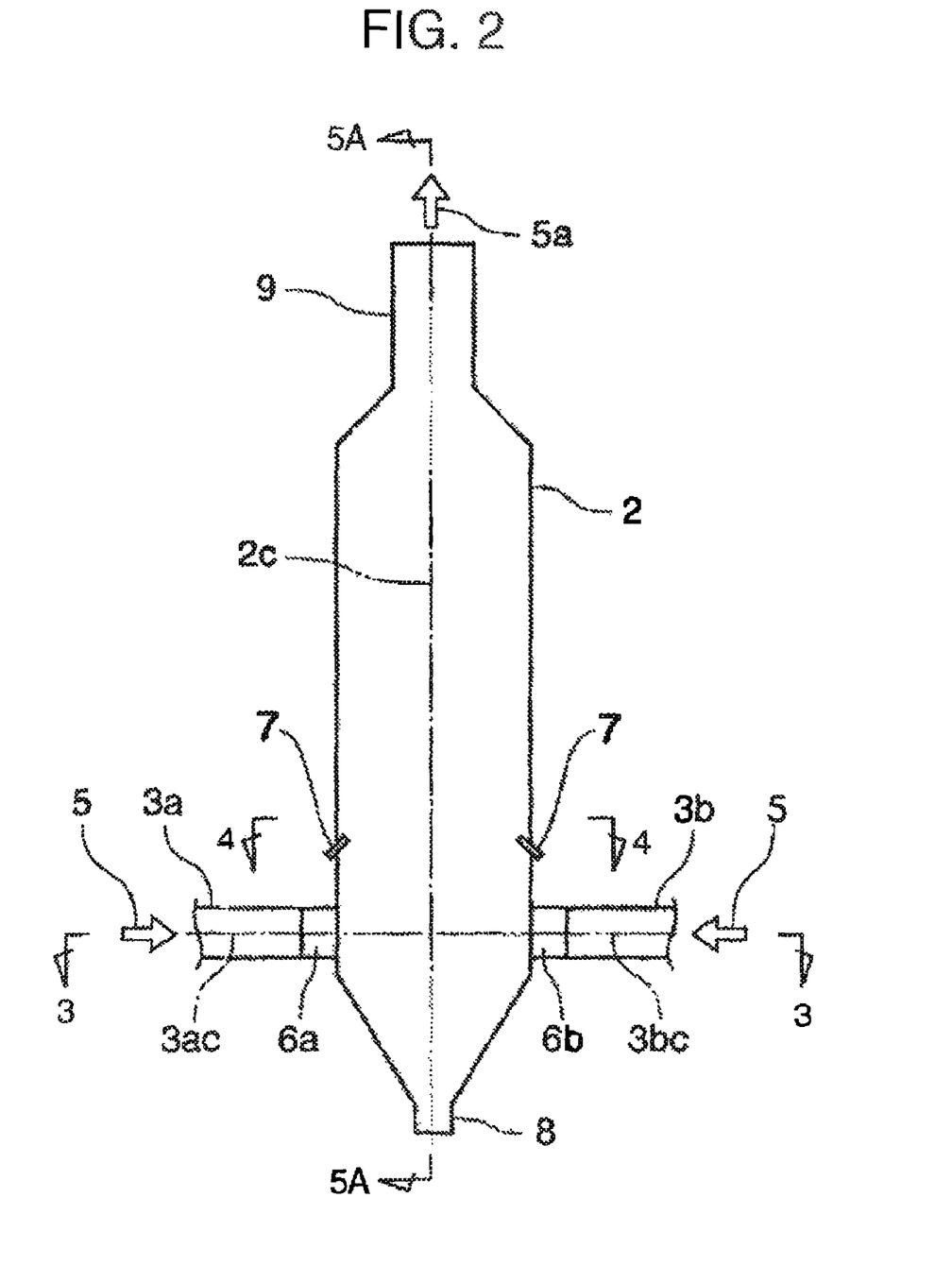
FIG. 2 is a schematic vertical sectional view for explaining a cooling tower illustrated in FIG. 1.
Figure 3:
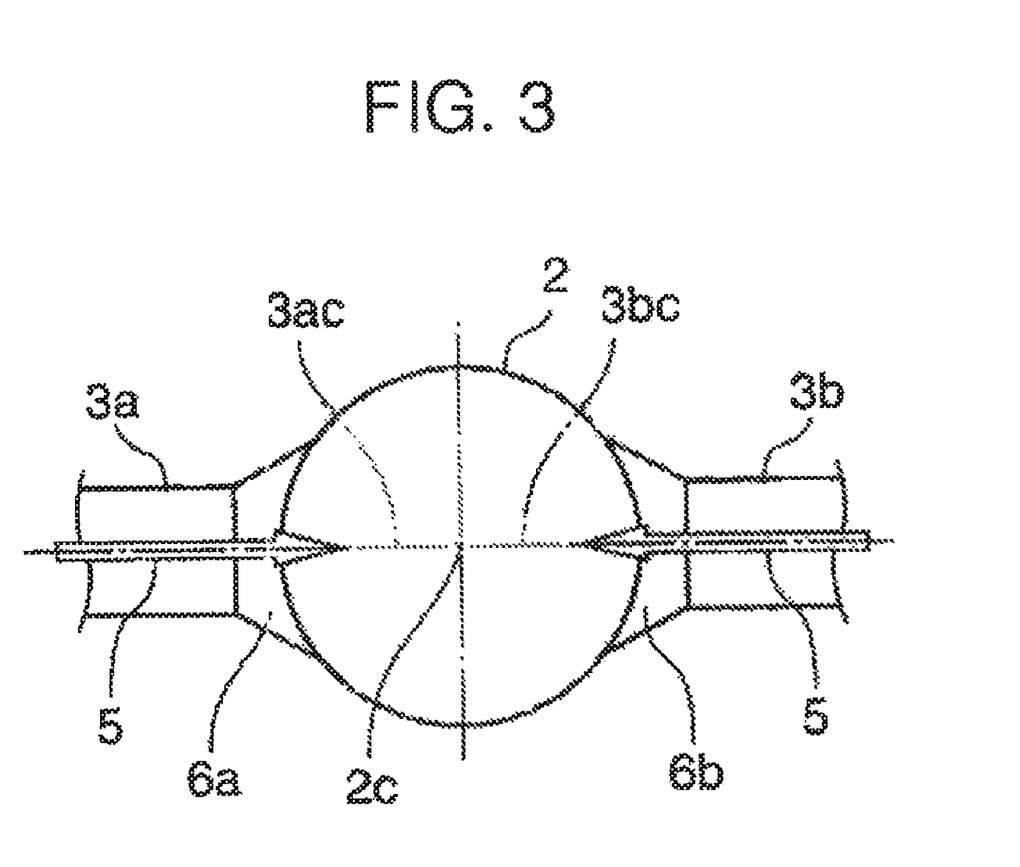
FIG. 3 is a sectional view taken along the line 3-3 in FIG. 2.
Figure 4:
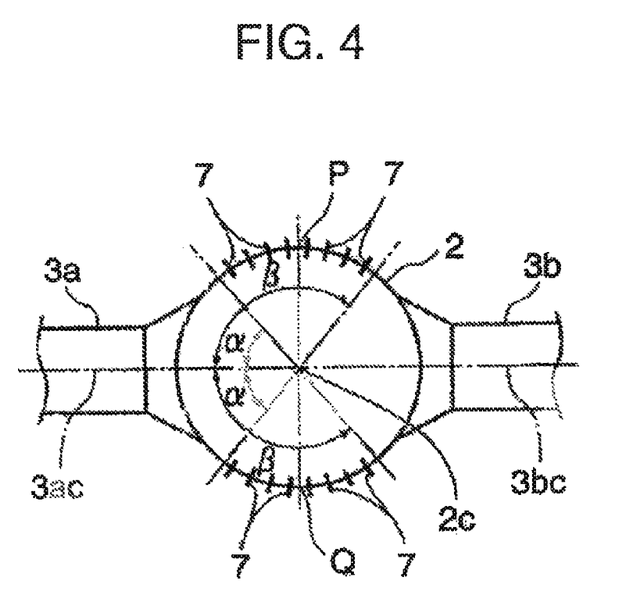
FIG. 4 is a sectional view taken along the line 4-4 in FIG. 2.

With reference to FIGS. 1 to 4, a first embodiment of the present invention will be described. FIG. 1 is a schematic system diagram for explaining a high-temperature exhaust-gas treatment system according to the first embodiment, and FIG. 2 is a schematic vertical sectional view for explaining a cooling tower illustrated in FIG. 1. FIG. 3 is a sectional view taken along the line 3-3 in FIG. 2, and FIG. 4 is a sectional view taken along the line 4-4 in FIG. 2.

The high-temperature exhaust-gas treatment system 1 illustrated in FIG. 1 comprises a reducing furnace 11, such as the rotary hearth type furnace described in the "Background Art", a cooling tower 2, and a dust collector 12. The reducing furnace 11 is a high-temperature gas generation source. A high-temperature exhaust gas is discharged from the reducing furnace 11, and introduced into the cooling tower 2 through a gas duct 3. In the cooling tower 2, the high-temperature exhaust gas is cooled by spray of cooling water. Based on this cooling, solid dusts, i.e., main raw materials in powder form, contained in the high-temperature exhaust gas are separately precipitated and collected, and volatile/melting components, such as zinc, lead and alkali metal, are solidified. The exhaust gas cooled in the cooling tower 2 is discharged to a gas duct 4 and introduced into the dust collector 12. In the dust collector 12, the volatile/melting component dusts, i.e., the solidified volatile/melting components, entrained by the exhaust gas, are separated and collected.

The solid dusts mainly consist of powdered raw materials, such as powdered coal, iron and ore, discharged directly or in the form of reduction products thereof, and therefore contain a large amount of iron oxide powder and iron powder. The volatile/melting component dusts mainly consist of zinc, lead and alkali metals, such as Na and K, and a part of the dusts contain oxides, sulfides and chlorides of the alkali metals and others.

In preceding and/or subsequent stages of the cooling tower 2, there may be disposed a heat exchanger for heat recovery, such as a boiler or an air preheater.

The cooling tower 2 is formed to have an axis 2c as shown in FIG. 2, and installed such that the axis 2c extends in an upward/downward direction (approximately vertical direction). The cooling tower 2 has a lower portion provided with two inlet ports 6a, 6b, to which a high-temperature exhaust gas 5 is introduced respectively, through after-mentioned two gas duct lines 3a, 3b. The cooling tower 2 is provided with a plurality of water-spraying nozzles 7, each of which is adapted to spray cooling water so as to cool the high-temperature exhaust gas 5. Based on this cooling, solid dusts contained in the high-temperature exhaust gas are precipitated, and discharged from a dust discharge port 8, while the cooled exhaust gas 5a is discharged from an outlet port 9 provided in an upper portion of the cooling tower 2, containing volatile/melting component dusts, i.e., solidified volatile/melting components, and sent to the dust collector 12 in the subsequent stage.

In other words, according to a high-temperature exhaust-gas treatment method in the first embodiment, as shown in FIG. 3 which is a top plan view of the cooling tower 2 (i.e., when viewed from a direction along the axis 2c of the cooling tower 2), the gas duct 3 on an introduction side is branched into the two gas duct lines 3a, 3b, and the high-temperature exhaust gas 5 containing the aforementioned dusts are introduced into the cooling tower 2 through the branched gas duct lines 3a, 3b and the inlet ports 6a, 6b, preferably, in such a manner that respective portions of the high-temperature exhaust gas 5 from the branched gas duct lines 3a, 3b become equal to each other in flow velocity and flow volume. In addition, respective axes 3ac, 3bc of the two gas duct lines 3a, 3b are arranged so as to extend in directions opposed to each other and approximately orthogonal to the axis 2c of the cooling tower 2 extending in the upward/downward direction.

Thus, the high-temperature exhaust gas 5 discharged from the reducing furnace 11 is introduced into the two gas duct lines 3a, 3b, and two flows of the high-temperature exhaust gas 5 are introduced from the gas duct lines 3a, 3b into the cooling tower in directions opposed to each other, so as to collide with each other within the cooling tower 2. This collision causes horizontal kinetic energy consumption of the two flows of the high-temperature exhaust gas 5. As a result, a homogeneous upward flow without swirling and vortex flows is formed in the cooling tower 2, and spraying cooling water to this upward flow enables uniform and rapid cooling. In this way, the volatile/melting components contained in the high-temperature exhaust gas 5 are rapidly cooled down to a temperature equal to or less than a vaporization point and a melting point to be liquefied or solidified, thus being discharged from the outlet port 9 together with the exhaust gas 5a. This effectively prevents the volatile/melting components from adhering onto an inner wall of the cooling tower 2 and others. In addition, the consumption of the kinetic energy caused by the collision between the gas flows significantly reduces a flow velocity of the gas flows, thereby promoting precipitation of solid dusts entrained by the high-temperature exhaust gas 5 to enhance efficiency in collecting the solid dusts to the dust discharge port 8.

As means for equalizing respective flow velocities and respective flow volumes of the two flows of the high-temperature exhaust gas 5 to be introduced from the gas duct lines 3a, 3b into the cooling tower 2 through the inlet ports 6a, 6b, a technique using dampers may be used for example. Specifically, under a condition where respective flow passages of the two gas duct lines 3a, 3b are set to become equal to each other in sectional area and respective openings of the inlet ports 6a, 6b are set to become equal to each other in sectional areas, each of the dampers, which is provided on an upstream side of each of the gas duct lines 3a, 3b, may be given an opening set to allow respective portions of the high-temperature exhaust gas 5 passing through the gas duct lines 3a, 3b to become equal to each other in flow velocity and flow volume. However, the means for adjusting the flow velocity and the flow volume is not limited to the technique using dampers.

The introduction of the two flows of the high-temperature exhaust gas 5 from the gas duct lines 3a, 3b into the cooling tower 2 at the same flow velocity and in the same flow volume as above mentioned is essential to causing the consumption of the horizontal kinetic energy of the gas flows during collision between the opposed gas flows of the high-temperature exhaust gas 5 within the cooling tower 2, and forming a homogenous upward flow without swirling and vortex flows based on the energy consumption, so as to achieve uniform cooling by spray of cooling water. A significant difference in flow velocity and flow volume between the two flows of the high-temperature exhaust gas 5 to be introduced from the gas duct lines 3a, 3b causes an imbalance between the opposed gas flows which collide with each other within the cooling tower 2, and deteriorate the effect of causing the consumption of the horizontal kinetic energy. This allows generation of swirling and vortex flows, which hinders uniform cooling by spray of cooling water.

The water-spray from the water-spraying nozzles 7 in the cooling tower 2 is preferably performed from a position on an upper side relative to the inlet ports 6a, 6b for introducing the high-temperature exhaust gas 5 into the cooling tower 2. The water-spray from the above position can promote entrainment of cooling water to the upward flow of the high-temperature exhaust gas 5 in the cooling tower 2, thus extending a residence time of the cooling water for cooling the high-temperature exhaust gas 5.

As show in FIG. 4 which is a top plan view of the cooling tower 2, the plurality of water-spraying nozzles 7 may be arranged at respective positions along a circumferential direction of the cooling tower 2 about the axis 2c thereof. In this case, given that the water-spraying nozzles 7 are arranged in an angular range of an angle $\alpha$ to an angle $\beta$ in circumferentially clockwise and counterclockwise directions on the basis of the axis 3ac of the gas duct line 3ac, the angle $\alpha$ and the angle $\beta$ are preferably set at 45 degrees and 135 degrees, respectively. These angles $\alpha$ and $\beta$ may be set at the same degrees also on the basis of the axis 3bc of the gas duct line 3bc. In the example illustrated in FIG. 4, eight water-spraying nozzles 7 are arranged in each of two preferred circumferential angular ranges ($\beta-\alpha=90$ degrees) having respective centers at points P and Q which are intersecting points between a straight line extending in a direction orthogonal to the axes 3ac, 3bc through the axis 2c, and an inner peripheral surface of the cooling tower 2 (i.e., total sixteen water-spraying nozzles 7).

That is, in the present invention, the water-spraying is preferably performed from positions in an angular range of ±45 degrees from each of the points P, Q located on the inner peripheral surface of the cooling tower 2 at positions where $\alpha=\beta=90$ degrees in circumferentially clockwise and counterclockwise directions and about the axis 2c of the cooling tower 2. The reason is that each of the points P, Q is located at the farthest position from the inlet ports 3a, 3b in the circumferential direction of the inner peripheral surface of the cooling tower 2. More specifically, a position corresponding to each of the points P, Q is insusceptible to influences of the high-temperature exhaust gas 5 to be introduced from the inlet ports 3a, 3b into the cooling tower 2, and the circumferential range of ±45 degrees from each of the points P, Q is optimal as an angular range for arranging the water-spraying nozzles 7 to avoid the influences of the high-temperature exhaust gas 5.

This high-temperature exhaust-gas treatment method is suitable for treating a high-temperature exhaust gas discharged from a reducing furnace for producing reduced iron. As has been previously described, the high-temperature exhaust gas discharged from the reducing furnace contains a relatively large amount of solid dusts, i.e., main raw materials in powder form, and volatile/melting components, such as zinc, lead and alkali metal. The solid dusts mainly consist of powdered raw materials, such as powdered coal, iron and ore, discharged directly or in the form of reduction products thereof, and therefore contain a large amount of iron oxide powder and iron powder. The volatile/melting component dusts mainly consist of zinc, lead and alkali metals, such as Na and K, and a part of the dusts contain oxides, sulfides and chlorides of the alkali metals and others. Since these dusts are likely to adhere onto the inner wall of the cooling tower when cooled in a cooling tower, the application of the present invention to the above exhaust gas is significantly effective.

As mentioned above, in the high-temperature exhaust-gas treatment method according to the first embodiment, respective portions of high-temperature exhaust gas 5 passing through the two gas duct lines 3a, 3b are introduced into the cooling tower 2 in such a manner as to become equal to each other in flow velocity and flow volume, and from directions opposed to each other. Further, respective axes 3ac, 3bc of the gas duct lines 3a, 3b are arranged so as to extend in directions approximately orthogonal to the axis 2c of the cooling tower 2 extending in the upward/downward direction, in top plan view of the cooling tower 2. From the gas duct lines 3a, 3b into the cooling tower 2 is introduced opposed flows of the high-temperature exhaust gas 5, which collide with each other to effectively consume the horizontal kinetic energy thereof. As a result, there is formed a homogenous upward flow without swirling and vortex flows, the spray of cooling water to which enables uniform cooling of the high-temperature exhaust gas 5. This makes it possible to rapidly cool volatile/melting components contained in the high-temperature exhaust gas 5 to liquefy and solidify the volatile/melting components and discharge the liquefied and solidified volatile/melting components from the outlet port 9 together with the exhaust gas 5a, thus effectively suppressing adhesion of the volatile/melting components onto the inner wall or the like of the cooling tower 2. In addition, the consumption of the kinetic energy significantly reduces a flow velocity of the gas flows, thus promoting precipitation of solid dusts entrained by the exhaust gas 5a to enhance efficiency in collecting the solid dusts to the dust discharge port 8.

Experimentation on First Embodiment

Figure 5A:
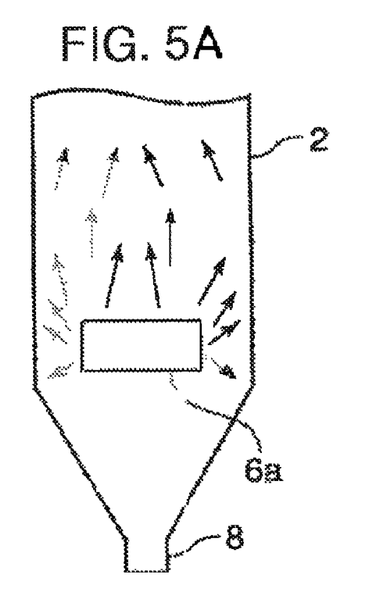
FIG. 5A is a velocity distribution map showing velocity vectors at key positions in a section taken along the line 5A-5A in FIG. 2.
Figure 5B:
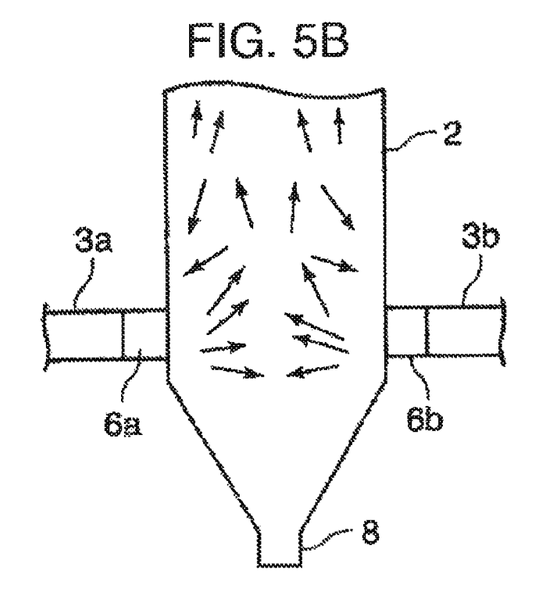
FIG. 5B is a velocity distribution map showing velocity vectors at key positions in the vertical section illustrated in FIG. 2.
Figure 6:
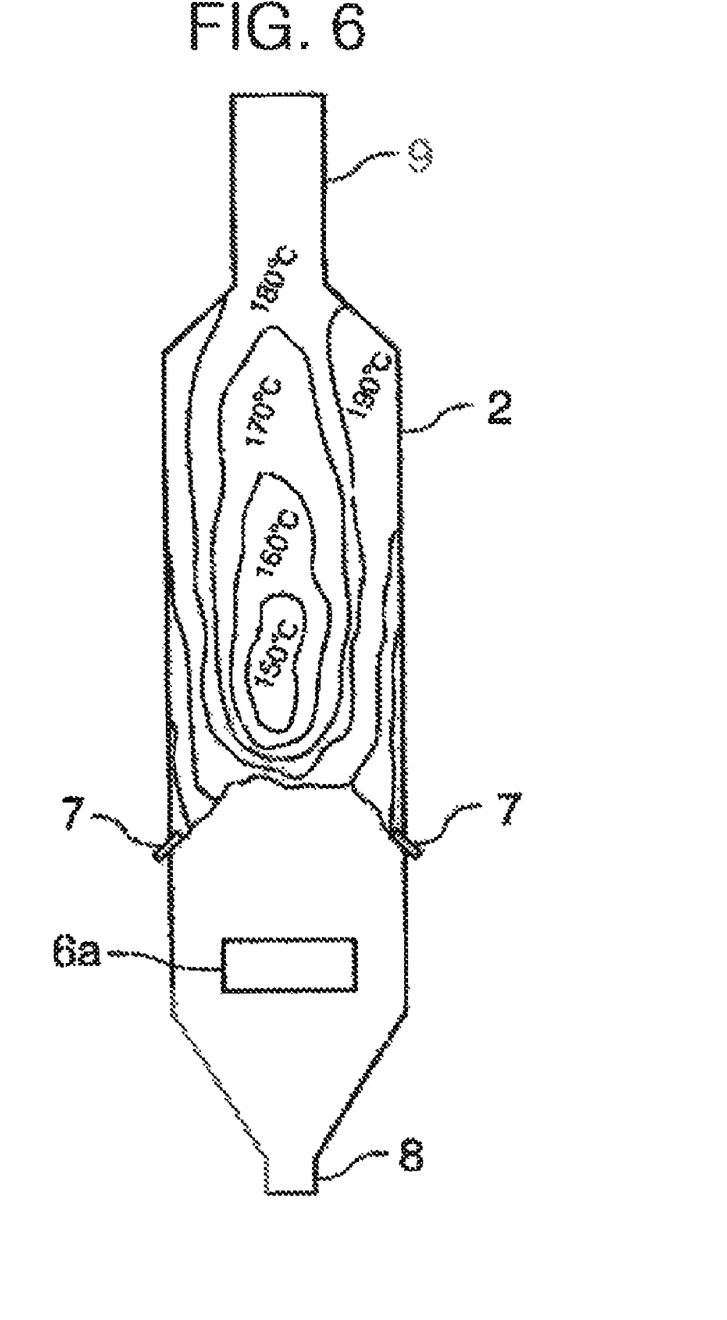
FIG. 6 is a temperature distribution map in the section taken along the line 5A-5A in FIG. 2, in the cooling tower of the high-temperature exhaust-gas treatment system according to the first embodiment of the present invention.

With reference to FIGS. 5 and 6, an experimentation on the first embodiment will be described below. This experimentation is based on a numerical test of subjecting a high-temperature exhaust gas discharged from the reducing furnace (rotary hearth furnace) 11 for producing reduced iron, to a cooling treatment in the cooling tower 2. FIG. 5 is a velocity distribution map in the cooling tower 2 of the high-temperature exhaust-gas treatment system according to the first embodiment. Specifically, FIG. 5(a) is a velocity distribution map showing velocity vectors at key positions in a section taken along the line 5A-5A in FIG. 2, and FIG. 5(b) is a velocity distribution map showing velocity vectors at key positions in the vertical section illustrated in FIG. 2. FIG. 6 is a temperature distribution map in the section taken along the line 5A-5A in FIG. 2, in the cooling tower 2.

In this numerical test, a high-temperature exhaust gas discharged from the rotary hearth furnace 11 was introduced from the inlet ports 6a, 6b into the cooling tower 2 illustrated FIGS. 2 to 4, while containing 11.4 g/Nm$^3$ of dusts, in a gas quantity of 87,903 Nm$^3$/h and at a temperature of 277° C. To the high-temperature exhaust gas was sprayed water at a temperature of 25° C., together with a compressed air at a temperature of 25° C. The amount of flow of the water was 4,140 kg/h, and that of the compressed air was 1,279 Nm$^3$/h. The exhaust gas cooled by this spraying was discharged from the outlet port 9 at a temperature of 180° C.

FIG. 5 shows a measurement result of the velocity distribution in the cooling tower 2. Each arrowed line represented in FIG. 5 indicates a velocity vector at an initial point of the arrowed line. Specifically, an orientation of the arrowed line indicates a flow-line direction, and a length of the arrowed line indicates a relative scale of velocity.

As to the velocity distribution in the cooling tower 2, in the vertical section illustrated in FIG. 5(a), taken along the line 5A-5A in FIG. 2, i.e., a vertical section including the points P, Q in FIG. 4, there is formed a homogenous upward flow field having approximately even flow velocities in all the points, except a vicinity of the inlet port 6a. In contrast, in the vertical section illustrated in FIG. 5(b) (vertical section illustrated in FIG. 2), i.e., a vertical section including the axis 3ac of the gas duct line 3a and the axis 3bc of the gas duct line 3b in FIG. 4, formed is an flow field inhomogeneous particularly in flow-line direction. This numerical test result shows that the position of each of the points P, Q is unsusceptible to influences of the high-temperature exhaust gas 5 to be introduced from the inlet ports 3a, 3b into the cooling tower 2, and a circumferential range having a center at each of the points P, Q is optimal as a range for spraying cooling water.

The above water-spray achieves a temperature distribution as shown in FIG. 6, specifically confining a low-temperature region of 150 to 170° C. within a central region of the internal space of the cooling tower and forming a high-temperature region of 190° C. or more in a vicinity of the inner wall of the cooling tower. Further, it forms approximately the same temperature distribution also in the vertical section illustrated in FIG. 2. In the temperature region, volatile/melting components contained in the high-temperature exhaust gas to be introduced thereinto are effectively cooled and solidified to be discharged. On the other hand, in the high-temperature region formed in the vicinity of the inner wall of the cooling tower is effectively prevented that the volatile/melting components are solidified to adhere onto a wall surface of the cooling tower.

Figure 7:
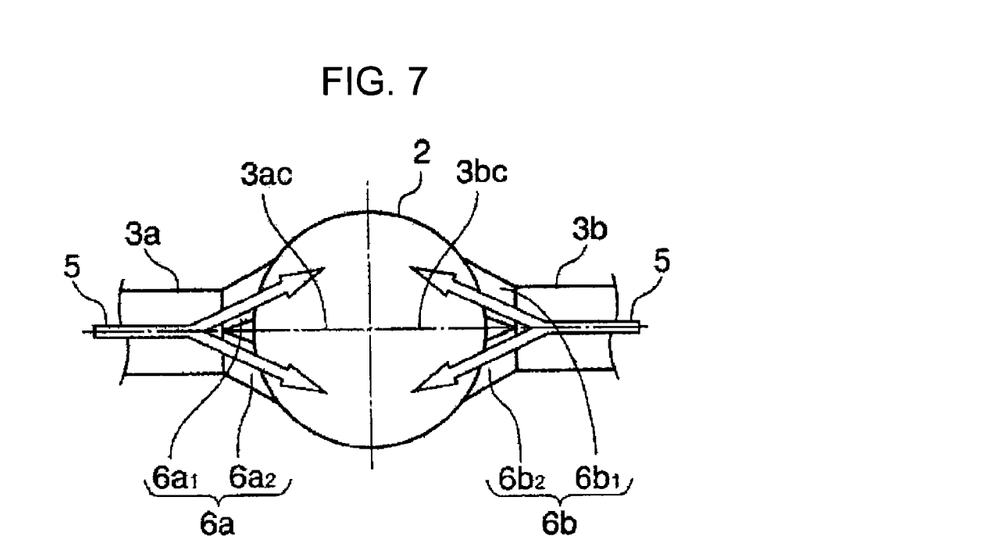
FIG. 7 is a schematic sectional view showing a second embodiment of the present invention, which corresponds to the sectional view taken along the line 3-3 in FIG. 2.

With reference to FIG. 7, a high-temperature exhaust-gas treatment method according to a second embodiment of the present invention will be described below. FIG. 7 is a schematic sectional view showing the second embodiment, which corresponds to the sectional view taken along the line 3-3 in FIG. 2. A difference between the second embodiment and the first embodiment is only in a structure for introducing a high-temperature exhaust gas 5 into the cooling tower, and the remaining structure in the two embodiments is identical to each other. On this account, the following description about the second embodiment mentions only the difference from the first embodiment, defining a common element or component to that in the first embodiment by the same reference numeral or code.

While the inlet ports 6a, 6b in the first embodiment are fluidically communicated with the gas duct lines 3a, 3b in one-to-one correspondence, in the second embodiment, the inlet port 6a fluidically communicated with the gas duct line 3a is divided into two inlet sub-ports 6a1, 6a2, along a horizontal direction, and the inlet port 6b fluidically communicated with the gas duct line 3b is divided into two inlet sub-ports 6b1, 6b2, along the horizontal direction. Thus, the high-temperature exhaust gas 5 is introduced into the cooling tower 2 from the inlet sub-ports 6a1, 6a2 and the inlet sub-ports 6b1, 6b2, through the gas duct lines 3a, 3b.

Each of the inlet ports 6a, 6b may be divided into three or more. In this case, the number of division of each the inlet ports 6a, 6b is also preferably equal to each other. More preferably, flow velocities and flow volumes in the respective divided inlet sub-ports are equal to each other.

The division of the inlet ports 6a, 6b into the same number of inlet sub-ports ensures an adequate balance in collision between opposed flows of the high-temperature exhaust gas 5 introduced from the inlet sub-ports. Further, equalization of the flow velocities and the flow volumes in the respective divided inlet sub-ports to each other expands a range in which a homogenous upward flow without swirling and vortex flows can be formed, and promotes kinetic energy dispersion by the collision between the opposed flows of the high-temperature exhaust gas 5, thus further reducing the flow velocity.

As mentioned above, the present invention provides a method of treating a high-temperature exhaust gas, which comprises an introduction step of introducing the high-temperature exhaust gas into a cooling tower through a gas duct, and a cooling step of spraying cooling water to the high-temperature exhaust gas in the cooling tower to cool the high-temperature exhaust gas. In the introduction step, the high-temperature exhaust gas is introduced into the cooling tower through the gas duct comprising two gas duct lines, in such a manner that respective portions of the high-temperature exhaust gas from the two gas duct lines become equal to each other in flow velocity and flow volume, and respective axes of the two gas duct lines are arranged so as to extend in directions opposed to each other and approximately orthogonal to an axis of the cooling tower, when viewed from a direction along the axis of the cooling tower.

Based on the introduction of the high-temperature exhaust gas in the above manner, the opposed flows of the high-temperature exhaust gas introduced from the gas duct lines into the cooling tower collide with each other to effectively consume horizontal kinetic energy of the flows of the high-temperature exhaust gas. This enables forming a homogenous upward flow without swirling and vortex flows, and the spray of cooling water to the upward flow realizes a uniform cooling of the high-temperature exhaust gas. This uniform cooling can effectively suppress adhesion of volatile/melting components contained in the high-temperature exhaust gas onto an inner wall of the cooling tower. In addition, the consumption of the kinetic energy significantly reduces a flow velocity of the high-temperature exhaust gas, thus promoting precipitation of solid dusts entrained by the high-temperature exhaust gas to enhance efficiency in collecting the solid dusts to a lower portion of the cooling tower.

The high-temperature exhaust gas is preferably introduced from a lower portion of the cooling tower in the introduction step, and discharged from an upper portion of the cooling tower after the cooling step. This enables forming a smooth flow field along the upward flow in the cooling tower, further equalizing the cooling by the water-spray.

In this case, the cooling water is preferably sprayed from a position on an upper side relative to a position from which the high-temperature exhaust gas is introduced into the cooling tower. The water-spray from this position promotes entrainment of cooling water to the upward flow of the high-temperature exhaust gas in the cooling tower, so as to extend a residence time of the cooling water in the cooling tower for cooling the high-temperature exhaust gas.

More preferably, the cooling tower has a inlet port fluidically communicated with each of the gas duct lines, and each of the inlet ports is divided into a same number of inlet sub-ports in a circumferential direction of the cooling tower about the axis of the cooling tower, wherein the high-temperature exhaust gas passing through each of the gas duct lines is introduced into the cooling tower in the introduction step through the divided inlet sub-ports in each of the gas inlet ports. The division of the inlet ports into the same number of inlet sub-ports can ensure an adequate balance in collision between opposed flows of the high-temperature exhaust gas introduced from the inlet sub-ports.

In this case, the high-temperature exhaust gas is preferably introduced into the cooling tower during the introduction step, in such a manner that respective portions of the high-temperature exhaust gas in the divided inlet sub-ports become equal to each other in flow velocity and flow volume. This expands a range in which a homogenous upward flow without swirling and vortex flows can be formed, and promotes kinetic energy dispersion by the collision between the opposed flows of the high-temperature exhaust gas, thus further reducing the flow velocity.

The spray of cooling water in the cooling tower is preferably performed in a circumferential angular range of 45 to 135 degrees along an inner peripheral surface of the cooling tower from each of the axes of the gas duct lines and about the axis of the cooling tower. In the above angular range, the upward flow in the cooling tower has high homogeneity of flow velocities, which allows the water-spray to exert an effective and uniform cooling effect.

The present invention is effective, particularly when the high-temperature exhaust gas is a gas discharged from a reducing furnace for producing reduced iron. Although this high-temperature exhaust gas contains a large amount of volatile/melting components and solid dusts, the use of the present invention makes it possible to effectively suppress adhesion of solidified and liquefied substances produced from the volatile/melting components and the solid dusts onto the inner wall of the cooling tower, thus achieving a desired operation.

What is claimed is:

1. A method for treating a high-temperature exhaust gas containing dusts, said method comprising:
   introducing said high-temperature exhaust gas into a cooling tower through a gas duct; and
   spraying cooling water to said high-temperature exhaust gas in said cooling tower to cool said high-temperature exhaust gas,
   wherein said gas duct comprises two gas duct lines in such a manner that respective portions of said high-temperature exhaust gas from said two gas duct lines become equal to each other in flow velocity and flow volume, and respective axes of said two gas duct lines are arranged so as to extend in directions opposed to each other and approximately orthogonal to an axis of said cooling tower, when viewed from a direction along said axis of said cooling tower, and
   wherein two flows of the high-temperature exhaust gas from the two gas duct lines form a homogeneous upward flow without swirling and vortex within the cooling tower.

2. The method as defined in claim 1, wherein said high-temperature exhaust gas is introduced from a lower portion of said cooling tower during said introducing said high-temperature exhaust gas, and discharged from an upper portion of said cooling tower after cooling said high-temperature exhaust gas.

3. The method as defined in claim 2, wherein said cooling water is sprayed from a position on an upper side relative to a position from which said high-temperature exhaust gas is introduced into said cooling tower.

4. The method as defined in claim 1, wherein said cooling tower has an inlet port fluidically communicated with each of said gas duct lines, each of said inlet ports being divided into a same number of inlet sub-ports in a circumferential direction of said cooling tower about said axis of said cooling tower, wherein said high-temperature exhaust gas passing through each of said gas duct lines is introduced into said cooling tower through said divided inlet sub-ports in each of said gas inlet ports.

5. The method as defined in claim 4, wherein said high-temperature exhaust gas is introduced into said cooling tower, in such a manner that respective portions of said high-temperature exhaust gas in said divided inlet sub-ports become equal to each other in flow velocity and flow volume.

6. The method as defined in claim 1, wherein said spraying of cooling water in said cooling tower is performed in a circumferential angular range of 45 to 135 degrees along an inner peripheral surface of said cooling tower from each of said axes of said gas duct lines and about said axis of said cooling tower.

7. The method as defined in claim 1, wherein said high-temperature exhaust gas is a gas discharged from a reducing furnace for producing reduced iron.

8. The method as defined in claim 1, wherein respective flow passages of the two gas duct lines are set to become equal to each other in sectional areas and respective openings of inlet ports are set to become equal to each other in sectional areas.

\* \* \* \* \*